United States Patent [19]

Patel

[11] Patent Number: 5,503,935

[45] Date of Patent: Apr. 2, 1996

[54] HEAT CURABLE PRIMERLESS SILICONE HARDCOAT COMPOSITIONS, AND THERMOPLASTIC COMPOSITES

[75] Inventor: Gautam A. Patel, Clifton Park, N.Y.

[73] Assignee: General Electric Company, Schenectady, N.Y.

[21] Appl. No.: 359,712

[22] Filed: Dec. 20, 1994

Related U.S. Application Data

[63] Continuation of Ser. No. 151,651, Nov. 15, 1993, abandoned, which is a continuation-in-part of Ser. No. 880,777, May 11, 1992, abandoned.

[51] Int. Cl.$^6$ .............................. B32B 27/36; B32B 9/04; C08K 3/36; C08L 83/02
[52] U.S. Cl. .......................... 428/412; 428/447; 524/588; 524/837; 524/858
[58] Field of Search ................................ 428/447, 412; 524/858, 588, 837; 525/100; 528/25, 26, 34; 522/84

[56] References Cited

U.S. PATENT DOCUMENTS

| | | | |
|---|---|---|---|
| 3,986,997 | 10/1976 | Clark | 260/29.2 |
| 4,027,073 | 5/1977 | Clark | 428/412 |
| 4,177,315 | 12/1979 | Ubersax | 428/336 |
| 4,218,508 | 8/1980 | Humphrey, Jr. | 428/412 |
| 4,298,632 | 11/1981 | Schroeter et al. | 428/412 |
| 4,309,319 | 1/1982 | Vaughn, Jr. | 260/9 |
| 4,330,446 | 5/1982 | Miyosawa | 523/409 |
| 4,413,088 | 11/1983 | Frye | 524/714 |
| 4,436,851 | 3/1984 | Vaughn, Jr. | 524/43 |
| 4,615,947 | 10/1986 | Goossens | 428/412 |
| 4,684,538 | 8/1987 | Klemarczyk | 428/424.2 |
| 5,041,313 | 8/1991 | Patel | 427/379 |
| 5,349,002 | 9/1994 | Patel | 524/858 |
| 5,411,807 | 5/1995 | Patel et al. | 524/837 |

FOREIGN PATENT DOCUMENTS

| | | | |
|---|---|---|---|
| 439293 | 1/1991 | European Pat. Off. | |
| 439294 | 1/1991 | European Pat. Off. | |
| 0505737 | 9/1992 | European Pat. Off. | 522/84 |

OTHER PUBLICATIONS

Thermosetting Acrylic Copolymers—Organic Polymer Chemistry, Saunders K. J. Chapman Hall, London (1973) pp. 132–135.

Production of High Solids Acrylic Coating Resins with t–Amyl Peroxides: A New Way to Meet VOC Requirements, VR Kamath and JD Sargent, Jr. Journal of Coatings Technology, vol. 59, No. 746, Mar. 1987—pp. 51–56.

Article—Acrylic Copolymers, H. Mark et al—Encyclopedia of Polymer Science & Engineering vol. 4 (1986) pp. 374–375.

Article—Paint and Coatings: General—American Paint & Coatings Journal, Jan. 13, 1992, p. 27.

*Primary Examiner*—Susan W. Berman
*Attorney, Agent, or Firm*—William H. Pittman

[57] ABSTRACT

A primerless silicone hardcoat composition is provided which utilizes an acrylated or methacrylated polyurethane or an acrylic copolymer such as an acrylic polyol as an adhesion promoter in combination with silicone hardcoat ingredients.

7 Claims, No Drawings

HEAT CURABLE PRIMERLESS SILICONE HARDCOAT COMPOSITIONS, AND THERMOPLASTIC COMPOSITES

CROSS-REFERENCE TO RELATED APPLICATIONS

The present application is a continuation of application Ser. No. 08/151,651 filed Nov. 15, 1993 which in turn is a continuation-in-part of application Ser. No. 07/880,777 filed May 11, 1992 both now abandoned.

BACKGROUND OF THE INVENTION

The present invention relates to a one part primerless silicone hardcoat compositions comprising an aqueous/organic solvent silicone dispersion consisting essentially of colloidal silica, and a partial condensate of an organoalkoxysilane, in combination with an effective amount of an adhesion promoter, such as an acrylated or methacrylated polyurethane, or an acrylic copolymer, such as an acrylic polyol.

Prior the the present invention, as shown by Patel, U.S. Pat. No. 5,041,313, silicone hardcoat composites were made by a two part procedure by initially priming a thermoplastic substrate, such as a polycarbonate substrate, with a solution of a polyacrylic resin in a solvent blend, followed by the application of a silicone hardcoat composition. Goossens, U.S. Pat. No. 4,615,947, shows that a thermoset or thermoplastic acrylic polymer having a molecular weight of at least 15000 can be mixed with an organopolysiloxane to produce a primer layer on a thermoplastic substrate. The primer layer is used initially to increase the adhesion of a subsequently applied organopolysiloxane hardcoat.

European patent application 0439294A1 suggests that priming a thermoplastic substrate prior to the application of the silicone hardcoat is not necessary if a monomeric hydroxy acrylate such as 2-hydroxy ethyl methacrylate is added to the hardcoat mixture before it is thermally cured. However, the use of hydroxy acrylates in coating compositions has sometimes been restricted because of their toxicity, as taught in Chung, U.S. Pat. No. 4,486,504. It would be desirable therefore to be able to formulate one part heat curable silicone hardcoat compositions which can be directly applied in an environmentally safe manner onto a variety of thermoplastic substrates without the requirement of a primer.

SUMMARY OF THE INVENTION

The present invention is based on the discovery that an acrylated or methacrylated polyurethane, or an acrylic copolymer such as an acrylic polyol having an $\overline{M}_n$ (number average molecular weight) of at least 1000 can be used as an adhesion promoter in the aqueous/organic solvent silicone dispersion. The term "aqueous/organic solvent silicone dispersion" means a dispersion consisting essentially of colloidal silica and the partial condensate of an organoalkoxysilane as defined in more detail hereinafter. The resulting silicone hardcoat compositions can be applied directly onto a variety of unprimed thermoplastic substrates, such as a polycarbonate substrate, followed by a thermal cure to provide thermoplastic composites exhibiting improved adhesion and weathering resistance.

STATEMENT OF THE INVENTION

There is provided by the present invention, a heat curable primerless silicone hardcoat composition comprising by weight,
(A) 100 parts of resin solids in the form of an aqueous/organic solvent silicone dispersion having 10–50% by weight of solids and consisting essentially of 10–70% by weight of colloidal silica and 30–90% by weight of a partial condensate of an organoalkoxysilane, and
(B) 1 to 15 parts, and preferably 1 to 5 parts, of an adhesion promoter selected from the class consisting of an acrylated polyurethane, a methacrylated polyurethane, and an acrylic copolymer having reactive or interactive sites and an $\overline{M}_n$ in the range of about 1000 to about 10,000.

Organoalkoxysilanes which can be used in the preparation of the aqueous/organic solvent dispersion of the heat curable primerless silicone hardcoat compositions of the present invention are included within the formula, $$(R)_a Si(OR^1)_{4-a}, \qquad (1)$$

where R is a $C_{(1-6)}$ monovalent hydrocarbon radical and preferably a $C_{(1-4)}$ alkyl radical, $R^1$ is an R or a hydrogen radical and a is a whole number equal to 0 to 2 inclusive. Preferably, the organoalkoxysilane included within formula (1) is methyltrimethoxysilane, methyltrihydroxysilane, or a mixture thereof which can form a partial condensate.

Some of the aqueous/organic solvent dispersions of colloidal silica which can be used in the practice of the present invention are shown by Clark, U.S. Pat. No. 3,986,997 which is incorporated herein by reference. These aqueous/organic solvent dispersions can be prepared by adding a trialkoxysilane, such as methyltrimethoxysilane to a commercially available aqueous dispersion of colloidal silica such as Ludox HS of the E.I. duPont de Nemours and Company and Nalco 1034A of the Nalco Chemical Co. of Naperville, Ill. which has been treated with glacial acetic acid to adjust the pH. After the addition of the methyltrimethoxysilane, the resulting acidified dispersion is allowed to stand for about 1 hour until the pH is stabilized at about 4.5. The resulting compositions can be aged for several days to insure formation of the partial condensate of methyltrimethoxysilane and the silica methanol-water dispersion. Another source of a dispersion of colloidal silica is shown by Ubersax, U.S. Pat. No. 4,177,315 which utilizes a colloidal silica dispersion such as Ludox HS resulting from the hydrolysis of tetraethylorthosilicate by the addition of aliphatic alcohol and an acid. One of the preferred aqueous/organic solvent dispersions of colloidal silica can be made by initially mixing methyltrimethoxysilane and acetic acid, and thereafter adding Ludox, AS-40, the colloidal silica of the aforementioned Ubersax patent along with deionized water. The resulting mixture can then be agitated for 16 hours or more under ambient conditions during which time a suitable alcohol, such as isopropanol or butanol can be added. Additional organoalkoxysilanes included within formula (1) are for example,
tetraethoxysilane,
ethyltriethoxysilane,
diethyldiethoxysilane,
tetramethoxysilane,
methyltrimethoxysilane, and
dimethyldimethoxysilane.

The acrylated or methacrylated polyurethanes which can be utilized as adhesion promoters in the practice of the present invention can be a semi solid or viscous material which can be added to the aqueous/organic solvent silicone dispersion. These polyurethanes can have a molecular weight in the range of about 400 to about 1500. For example, there can be used acrylated urethanes, such as, Actilane CB-32, of the SNPE Chimie Company of France and Ebecryl 8804, (Radcure Specialties, Inc. of Louisville, Ky. which has a molecular weight of 1364). Some of the methacrylated urethanes which are included are M-407, of the Echo Resins & Laboratory located in Versailles, Mo. M-407 is an adduct of isophorone diisocyanate and 2-hydroxyethylmethacrylate and has a MW of 482.

The acrylic copolymers can be liquid or solid at 25° C. and can be added directly to the aqueous/organic solvent silicone dispersion. These acrylic copolymers can have reactive or interactive hydroxyl sites to provide a hydroxy number in the range of about 30 to about 160, an acid number of less than about 4, and an Mn of about 1000 to about 10,000. Some of these copolymers are shown in the Encyclopedia of Polymer Science and Engineering Mark et al, John Wiley & Sons, vol. 4 (1986) p. 374-375. As taught by Mark et al these copolymers can be prepared by the free radical polymerization of various comonomers. As shown by K. J. Saunders, in Organic Polymer Chemistry, Chapman Hall, London (1973) comonomers which can be used to make these copolymers or oligomers can vary depending upon the properties desired in the thermosetting copolymers. The following table illustrates some of the copolymers and their respective properties which can be made.

| Monomers conferring hardness | Monomers conferring flexibility | Monomers Conferring reactive sites |
|---|---|---|
| Acrylonitrile | Ethyl acrylate | Dimethylamino ethylmethacrylate |
| Methyl methacrylate | 2-Ethylhexyl acrylate | Acrylic acid |
| Stryene | Butyl acrylate | Butoxymethylacrylamide |
| Vinyltoluene | Methyl acrylate | Glycidyl acrylate |
| | | Hydroxyethyl acrylate |
| | | N-Methylol acrylamide |
| | | Acetoacetoxyethyl-methacrylate |
| | | acrylamide |
| | | 2-hydroxypropyl methacrylate |

Among the preferred acrylic copolymers are the Joncryl acrylic polyols of S. C.Johnson Wax Co. of Racine, Wis. and acryloid acrylic resin from Rohm and Haas Co., Philadelphia, Pa. The acrylic copolymers, from S. C. Johnson can have a hydroxyl number in the range of about 30 to about 160. Some of the acrylic copolymers having hydroxyalkylacrylates which confer silanol reactive or interactive sites are shown as follows:

| Resin | $\bar{M}_n$ | Polydispersity | Tg (°C.) | Hydroxyl No. |
|---|---|---|---|---|
| Joncryl 587 | 5500 | 2.7 | 40 | 94 |
| Joncryl 588 | 3500 | 2.7 | 20 | 120 |
| Joncryl 906 | 3210 | 2.9 | 36 | 94 |
| SCX-901 | 2330 | 2.7 | 20 | 112 |
| Joncryl 510 | 1340 | 1.7 | 5 | 140 |
| Joncryl 500 | 1300 | 1.7 | −5 | 140 |

Additional procedures for making the acrylic copolymers which can be used in the heat curable compositions of the present invention is shown by Kamath et al in Journal of Coating Technology, Vol. 59 No. 746, March 1987, pages 51–56

In the practice of the present invention, the heat curable primerless silicone hardcoat compositions can be made by combining the adhesion promoter, which hereinafter means the acrylated or methacrylated urethane, or the acrylic copolymer, with the aqueous/organic solvent silicone dispersion consisting essentially of organoalkoxysilane, colloidal silica and sufficient alcohol. Additional silicone dispersions which can be used with the adhesion promoter are shown by U.S. Pat. Nos. 4,624,870, 4,680,232 and 4,914,143 which are incorporated herein by reference. The silicone hardcoat compositions also can be catalyzed with tetra-n-butylammonium acetate (TBAA) to reduce the top coat cure time as shown in U.S. Pat. No. 4,863,520 which is incorporated herein by reference.

UV (ultraviolet light) light absorbing agents which are described by Ashby et al, U.S. Pat. Nos. 4,278,804, 4,374,674, and 4,419,405, Frye, U.S. Pat. No. 4,299,746 and by Anthony, U.S. Pat. Nos. 4,495,360 and 4,525,426 which are incorporated herein by reference, can be incorporated. UV absorbers such as those of hydroxy benzophenone and benzotriazole serves as well as the triazine, cyanoacrylates and benzylidene malonates. Other additives such as free radical initiators, hindered amine light stabilizers, antioxidants, dye, flow modifiers and leveling agents or surface lubricants can be used. Other colloidal metal oxides can be present at up to about 10% by weight of the aqueous/organic solvent dispersion with colloidal silica and include metal oxides such as, antimony oxide, cerium oxide, aluminum oxide and titanium dioxide. Preferred UV absorbers are the ones which coreact with silanes and is less likely to volatalize during the heat cure. Preferred compounds are 4[gamma-(trimethoxysilyl)propoxy]-2, hydroxybenzophenone, 4[gamma-(triethoxysilyl)propoxy-2, hydroxybenzophenone or their mixtures. Uv absorbers can be used as 2 to 20 wt. % level.

Organic solvents which can be used to make the aqueous/organic solvent silicone dispersion are preferably $C_{(1-4)}$ alkanol, such as methanol, ethanol, propanol, isopropanol, butanol; glycols and glycol ethers, such as propyleneglycolmethyl ether and mixtures thereof.

Aromatic thermoplastic substrates which can be used in the practice of the present invention to make silicone hardcoat-aromatic thermoplastic substrate composites are preferably aromatic polycarbonates, such as Lexan polycarbonate of the General Electric Company. In addition, other aromatic thermoplastic substrates also can be used, such as blends of polyphenylene ether and polystyrene, polyetherimides, polyesters and polysulfones.

The coating composition can be applied onto the aromatic thermoplastic substrate by anyone of the well known methods such as spraying, dipping, roll coating and the like. It can be cured thermally at 130° C. for 30 to 90 minutes, or by the use of infrared or microwave energy.

Composites made in accordance with the present invention can be used in applications, such as windshields, lamp envelopes and safety glasses.

In order that those skilled in the art will be better able to practice the present invention, the following example are given by way of illustration and not by way of limitation. All parts are by weight.

EXAMPLE

An aqueous/organic solvent silicone dispersion was prepared as follows:

There was mixed 203 grams of methyltrimethoxysilane with 1.25 grams of glacial acetic acid. There was added 41.5 grams of deionized water to 125.5 grams of Ludox AS (ammonium-stabilized colloidal silica sol, 40% SiO$_2$ having a silica particle diameter of about 22 millimicrons and a pH of 9.2) to reduce the SiO$_2$ level to 30 weight percent. The diluted silica sol was then added to the acidified methyltrimethoxysilane with stirring. The resulting solution was then stirred for another 16–18 hours at room temperature followed by the addition of 370 grams of a 1:1 (by weight) isopropanol/n-butanol solvent blend and 36 grams of 53% solution of 4-[gamma-(methoxy/ethoxy)silyl/propoxy]-2, hydroxy benzophenone in methanol. The mixture was then stirred for about 2 weeks at room temperature. The composition as formulated had 20% by weight solids, and contained 11% by weight of the UV absorber, based on calculated solids. The composition had a viscosity of about 5 centistokes at room temperature. The resin was mixed with 0.2% of tetra-n-butyl ammonium acetate (TBAA) catalyst and 0.4% of a silicone based leveling agent.

Five hundred parts of the above aqueous silicone dispersion was mixed with 1.25 to 5 parts of an acrylated urethane (Actilane CB-32, of SNPE Chimie of France), and a methacrylated urethane resulting from the reaction between isophorone diisocyanate and hydroxyethyl methacrylate (M-407, Echo Resins & Laboratory located in Versailles, Mo.). In addition blends of 500 parts of the aqueous silicone dispersion and 2.5 to 10 parts acrylic polyols Joncryls, from the S. C. Johnson Wax Company of Racine, Wis.) were also made. There were also evaluated thermoplastic and thermoset acrylics. For example, polyethylmethacrylate (polyethyl) having an I.V. of about 0.85 and polymethylmethacrylate (polymethyl) having an I.V. of about 1.3, from E. I duPont de Nemours Co, Wilmington, Del., and Hycar thermoset (237 and 256), acrylic polymer from B. F. Goodrich Co., Akron, Ohio.

Lexan polycarbonate panels (4"×6"×⅛") were flow coated with the silicone hardcoat compositions containing the adhesion promoters. The resulting treated panels were then air dried for about 20 minutes under ambient conditions and then cured in an air circulated oven for 60 minutes at 128° C. Optically clear coatings were obtained having a thickness of 4 to 10 microns.

The resulting silicone hardcoat-polycarbonate composites were then evaluated for scribed or crosshatch adhesion failure, crazing, and microcracking after water immersion from 1 to more than 30 days at 65° C. A cross cut pattern of 100 1 mm squares were scribed onto the treated hardcoat surface. Tape adhesion was checked with a 3M-610 tape according to ASTM D3359-83. The following results were obtained where PHR means parts, per 100 parts of resin solids:

| | | Water Immersion Test at 65° C. Scribed or Cross-Hatch Adhesion[1] Evaluation | |
|---|---|---|---|
| Parts of Adhesion Promoter PhR | Type of Adhesion Promoter | Scribed Adhesion Failure Time, Number of Days | Crazing or Microcracking |
| 0 | none | 1 | none |
| 2.5 | urethane, M-407 | 9 | yes |
| 5 | " | 29 | yes |
| 10 | " | 30 | yes |
| 1.25 | urethane, Actilane CB-32 | 1 | yes |
| 2.5 | " | 5 | yes |
| 5 | " | 27 | yes |
| 2.5 | Acrylic polyol, Jonacryl SCX-901 | >30 | none |
| 5 | " | >30 | none |
| 10 | " | >30 | none |

[1]Cross cut pattern of 100 1 mm squares. Tape adhesion checked with a 3M-610 tape according to ASTM D3359-83

The coated samples were immersed in a hot water bath at 65° C. and checked periodically. Complete or partial removal of coating along the scribed edges or any 1 mm size square is considered a failure. The following results were obtained "polymethyl" is poly(methylmethacrylate) and "polyethyl" is poly(ethylmethacrylate):

| | Water Immersion test at 65° C. Scribed Adhesion Evaluation | |
|---|---|---|
| Adhesion Promoter* | $\bar{M}_n$ | Failure Time, Number of Days |
| None, control | — | 2 No crazing |
| Joncryl-500 | 1300 | >21 " |
| Joncryl-510 | 1340 | >21 " |
| Joncryl-SCX-901 | 2330 | >21 " |
| Joncryl 906 | 3210 | >21 " |
| Joncryl-588 | 3500 | >21 " |
| Joncryl-587 | 5500 | >21 |
| Ebecryl 8804(PU) | 1364 | >25 " |
| Polymethyl | 185,000 | Insoluble |
| Polyethyl | 125,000 | 0** |
| Hycar thermoset | >200,000 | 0** |

*All evaluated at 2.5, 5 and 10 parts per hundred resin solids except Ebecryl 8804 which was tested at 2.5 PHR level.
**failed initial adhesion The primerless coatings were optically clear and showed % haze values of about 0.5 or less when tested according to the method of ASTM D-1003. The coatings were also abrasion resistant and showed % haze values of less than 10 when tested according to ASTM test method D-1044. The 4"×4" coated samples were abraded on the Taber abraser Model 5150 (Teledyne Co.) using two CS-10F wheels with 500 g weight on each wheel for 500 cycles. The % haze measurements of the abraded track were done on a colorimeter (Model XL-835, Pacific Scientific, Gardner Co.). The hardcoated polycarbonate sheet (⅛ inch thick) also was free of cracking or rupture when impacted with 320 lb/in force in accordance with ASTM D-3029-90 method G using a Gardner falling weight impact tester.

The above results show that the acrylic polyols are superior adhesion promoters for silicone hardcoat compositions. However, improved adhesion is also shown for urethane M-407 and Actilane CB-32 and Ebecryl 8804 when used at 2.5 to 10 part levels.

The above water immersion test was repeated except that in place of the acrylic polyol, 10 parts of 2-hydroxy ethyl methacrylate and acrylic acid were respectively added to the silicone hardcoat composition. The following results were obtained

| Amount of Acrylic Monomer | Type of Acrylic Monomer | Scribed Adhesion Failure Time Number of Days |
|---|---|---|
| 10 | 2-hydroxy ethyl methacrylate | 1 |
| 10 | Acrylic acid | Failed initial adhesion |
| None | — | 1 |

The above results show that the monomeric acrylic compounds are ineffective as adhesion promoters for silicone hardcoats applied and cured onto a thermoplastic substrate.

In addition to the scribed adhesion failure test after water immersion, composites having the primerless silicone hardcoat compositions were also evaluated for scribed adhesion failure, microcracking and delamination under accelerated QUV weathering conditions. A QUV accelerated weatherometer (Q-Panel Co.) was used. The weathering cycle consisted of 8 hours exposure to UV light with UV-B fluorescent FS-40 lamps at 70° C. and 4 hours exposure to condensed moisture in the dark at 50° C. It was found that scribed adhesion failure resulted after 350 hrs with composites treated with hardcoat free of the adhesion promoter, while 1300 to greater than 2000 hrs was shown for composites having 1.25 to 5 parts of the acrylated urethane CB-32. The methacrylated urethane M-407 adhesion promoter provided a scribed adhesion failure after 1300 to 2000 hrs at a 2.5 to 10 part levels. A range of 3200 hrs to 1900 hrs was shown for the acrylic polyols at 2.5 to 10 part levels. The microcracking and delamination results were found to be substantially equivalent or worse than the control when the acrylic polyols were used as adhesion promoters, since a high level of adhesion promoter may result in premature crazing or cracking. The following table shows additional adhesion results after QUV accelerated weathering for about 6 micron thick coatings.

| Adhesion Promoter (5 PHR on solids) | Cross-Hatch Adhesion (Failure time, Hours) |
|---|---|
| None | 350 |
| Joncryl 587 | 3100 |
| Joncryl 588 | 2900 |
| Joncryl 906 | 2700 |
| Joncryl 901 | 2700 |
| Joncryl 510 | 2700 |
| Joncryl 500 | 2700 |

Although the above example is directed to only a few of the very many variables which can be used in making the primerless silicone hardcoat compositions of the present invention, there is provided by the present invention, a much broader variety of primerless silicone hardcoat compositions as shown in the description preceding this example.

What is claimed is:

1. A heat curable primerless silicone hardcoat composition comprising by weight,
   (A) 100 parts of resin solids in the form of an aqueous/organic solvent silicone dispersion having 10–50% by weight of solids and consisting essentially of 10–70% by weight of colloidal silica and 30–90% by weight of a partial condensate of an organoalkoxysilane, and
   (B) 1 to 15 parts of an adhesion promoter selected from the group consisting of
      (i) an acrylated polyurethane adhesion promoter having an $\overline{M}_n$ of 400 to 1500 and selected from the group consisting of an acrylated polyurethane and a methacrylate polyurethane, and
      (ii) an acrylic copolymer having amine, carboxylic acid, amide, epoxy, hydroxy or acyloxy groups and an $\overline{M}_n$ in the range of about 1000 to about 10,000.

2. A heat curable primerless silicone hardcoat composition in accordance with claim 1, where the organoalkoxysilane is methyltrimethoxysilane.

3. A heat curable primerless silicone hardcoat composition in accordance with claim 1, where the adhesion promoter is an acrylic copolymer having hydroxy reactive sites.

4. A heat curable primerless silicone hardcoat composition in accordance with claim 1, where the adhesion promoter is an acrylated polyurethane.

5. A heat curable primerless silicone hardcoat composition in accordance with claim 1, where the adhesion promoter is a methacrylated polyurethane.

6. A composite of a thermoplastic sheet having a cured coating resulting from the cure of a heat curable primerless silicone hardcoat composition comprising by weight,
   (A) 100 parts of resin solids in the form of an aqueous/organic solvent silicone dispersion having 10–50% by weight of solids and consisting essentially of 10–70% by weight of colloidal silica and 30–90% by weight of a partial condensate of an organoalkoxysilane, and
   (B) 1 to 15 parts of an adhesion promoter selected from the group consisting of
      (i) an acrylated polyurethane adhesion promoter having an $\overline{M}_n$ of 400 to 1500 and selected from the group consisting of an acrylated polyurethane and a methacrylate polyurethane, and
      (ii) an acrylic copolymer having amine, carboxylic acid, amide, epoxy, hydroxy or acyloxy groups and an $\overline{M}_n$ in the range of about 1000 to about 10,000.

7. A composite in accordance with claim 6, where the thermoplastic sheet is a polycarbonate.

* * * * *